(12) United States Patent
Laudenklos

(10) Patent No.: US 8,220,560 B1
(45) Date of Patent: Jul. 17, 2012

(54) TRACTOR-MOUNTED PLOW BLADE

(76) Inventor: James Laudenklos, Newman Grove, NE (US)

( * ) Notice: Subject to any disclaimer, the term of this patent is extended or adjusted under 35 U.S.C. 154(b) by 78 days.

(21) Appl. No.: 12/930,685

(22) Filed: Jan. 13, 2011

(51) Int. Cl.
*A01B 51/00* (2006.01)

(52) U.S. Cl. .................. 172/272; 172/810; 37/231

(58) Field of Classification Search .......... 37/231, 37/232, 266, 270, 234, 267; 172/273, 272, 172/274, 275, 811, 810, 439; 280/759; 414/686
See application file for complete search history.

(56) References Cited

U.S. PATENT DOCUMENTS

| | | | |
|---|---|---|---|
| 3,400,475 A * | 9/1968 | Peitl ............................ | 37/233 |
| 3,410,008 A * | 11/1968 | Standfuss ..................... | 37/231 |
| 4,720,122 A | 1/1988 | Brimeyer et al. | |
| 4,936,737 A | 6/1990 | Rae et al. | |
| 5,387,076 A | 2/1995 | Fuzzen | |
| 5,388,950 A | 2/1995 | Schmahl et al. | |
| 5,437,532 A | 8/1995 | Kaczmarczyk et al. | |
| 5,870,839 A * | 2/1999 | Wissmiller ................... | 37/231 |
| 6,035,941 A | 3/2000 | Hirooka et al. | |
| 6,170,178 B1 * | 1/2001 | Christy ......................... | 37/231 |
| 6,594,923 B1 * | 7/2003 | Kost et al. ..................... | 37/231 |
| 6,618,964 B2 * | 9/2003 | Kost et al. ..................... | 37/231 |
| 6,817,118 B2 * | 11/2004 | Schmeichel .................. | 37/232 |
| 6,964,121 B2 * | 11/2005 | Harris ............................ | 37/231 |
| 7,168,907 B2 | 1/2007 | Lyons et al. | |
| 7,963,052 B2 * | 6/2011 | Koch et al. ................... | 37/231 |
| 2003/0183601 A1 | 10/2003 | Kruschke | |

* cited by examiner

*Primary Examiner* — Arpad Fabian-Kovacs
(74) *Attorney, Agent, or Firm* — Dennis L. Thomte; Thomte Patent Law Office LLC

(57) ABSTRACT

A tractor plow blade is selectively removably mounted on the forward end of the tractor by an attachment frame. The attachment frame is secured to a weight bracket or mount mounted on the forward end of the tractor and to the underside of the tractor. The plow blade may be raised or lowered with respect to the weight bracket and may be optionally pivoted about a vertical axis with respect to the tractor.

12 Claims, 8 Drawing Sheets

TRACTOR-MOUNTED PLOW BLADE

BACKGROUND OF THE INVENTION

1. Field of the Invention

This invention relates to a plow blade assembly which is mounted on the forward end of a tractor. More particularly, this invention relates to a plow blade assembly which is secured to a weight bracket at the forward end of the tractor and which is also secured to the underside of the tractor.

2. Description of the Related Art

Many types of plow blades have been previously provided which are mounted on the forward end of a tractor. In most of the prior art tractor-mounted plow blades, it is a time consuming and difficult task to mount the plow blade on the tractor and to remove the plow blade from the tractor.

Tractors such as those manufactured by Deere and Company have weight brackets or mounts on the forward end thereof which have weights mounted thereon to provide additional traction for those tractors having front-wheel drive or front-wheel drive assist. To the best of Applicant's knowledge, no one has previously used the weight bracket or mount as an attachment point for a plow blade.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A plow blade assembly is provided for mounting on the forward end of a tractor with the tractor having a forward end, a rearward end, a first side, a second side, and an underside. The plow blade assembly includes a plow blade having a front side, a back side, a first end, a second end, an upper end and a lower end. First and second plow blade support frames are secured to the back side of the plow blade in a horizontally spaced-apart manner. The plow blade assembly includes a first attachment frame means which is comprised of first and second attachment frames. The left end of the first attachment frame is secured to the first plow blade support frame and the right end of the first attachment frame is secured to the second plow blade support frame. The forward end of the second attachment frame is pivotally secured about a vertical axis to the first attachment frame. First and second hydraulic cylinders are secured to and extend between the first and second attachment frames for pivotally moving the first attachment frame and the plow blade with respect to the second attachment frame. The first and second hydraulic cylinders are movable between retracted and extended positions. The first and second hydraulic cylinders are fluidly connected so that when the first hydraulic cylinder is extending, the second hydraulic cylinder is retracting and so that when the first hydraulic cylinder is retracting the second hydraulic cylinder is extending.

A second attachment frame means is also provided which has a forward end, a rearward end, a first side and a second side. The rearward end of the second attachment frame means is selectively removably secured to the tractor at the underside thereof rearwardly of the forward end thereof. The rearward end of the first attachment frame is pivotally secured, about a horizontal axis, to the forward end of the second attachment frame means. The second attachment frame means includes a first upstanding post having upper and lower ends and a second upstanding post having upper and lower ends. The first and second upstanding posts extend upwardly from the forward end of the second attachment frame means in a horizontally spaced-apart manner. A third hydraulic cylinder is secured to and extends between the first upstanding post and the second attachment frame. A fourth hydraulic cylinder is secured to and extends between the second upstanding post and the second attachment frame. The third and fourth hydraulic cylinders are movable between extended and retracted positions. The retraction of the third and fourth hydraulic cylinders causes the plow blade to be raised with respect to the second attachment frame means. The extension of the third and fourth hydraulic cylinders causes the plow blade to be lowered with respect to the second attachment frame means.

A horizontally disposed support member is secured to and extends between the first and second upstanding post members. A mounting assembly is secured to the support member with the mounting assembly having a top wall with a forward end, a rearward end, a first end, a second end, an upper side and a lower side. The mounting assembly also includes a front wall, having upper and lower ends, which extends downwardly from the top wall adjacent the forward end thereof. The mounting assembly further includes a bottom wall which extends rearwardly from the lower end of the front wall. The mounting assembly has an elongated rod secured to the lower side of the top wall at the rearward end of the top wall.

A first elongated side plate, having rearward and forward ends, is secured to the first side of a tractor and a second elongated side plate, having rearward and forward ends, is secured to the second side of the tractor. A weight mount or bracket is secured to the forward ends of the first and second side plates and extends therebetween. The weight mount includes a forward end, a rearward end, an upper end and a lower end. The weight mount has an elongated and transversely extending rod secured thereto at the upper forward end thereof. The mounting assembly is selectively removably mounted on the weight mount with the elongated rod of the mounting assembly being positioned on the upper end of the weight mount rearwardly of the elongated rod on the weight mount and which is in engagement therewith. The bottom wall of the mounting assembly extends rearwardly beneath the lower end of the weight mount when the mounting assembly is mounted on the weight mount.

In the preferred embodiment, spacer blocks are positioned between the bottom wall of the mounting assembly and the lower end of the weight mount when the mounting assembly is mounted on the weight mount. In the preferred embodiment, the spacer blocks are selectively removably bolted to the bottom wall of the mounting assembly when the mounting assembly is mounted on the weight mount.

The structure disclosed herein provides a very convenient means for quickly attaching a plow blade to the front end of a tractor and for providing a quick and convenient means for detaching or removing the plow blade from the front end of the tractor.

It is therefore a principal object of the invention to provide an improved tractor-mounted plow blade.

A further object of the invention is to provide a plow blade assembly which is mounted on the forward end of the tractor with the plow blade assembly being secured to a weight mount at the forward end of the tractor and to the underside of the tractor.

A further object of the invention is to provide a tractor-mounted plow blade which is quickly and easily mounted on the forward end of a tractor.

A further object of the invention is to provide a tractor-mounted plow blade which is also quickly and easily removed from the tractor.

A further object of the invention is to provide a tractor-mounted plow blade which utilizes a weight mount at the forward end of a tractor as an attachment point.

A further object of the invention is to provide a tractor-mounted plow blade which is economical of manufacture and durable in use.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
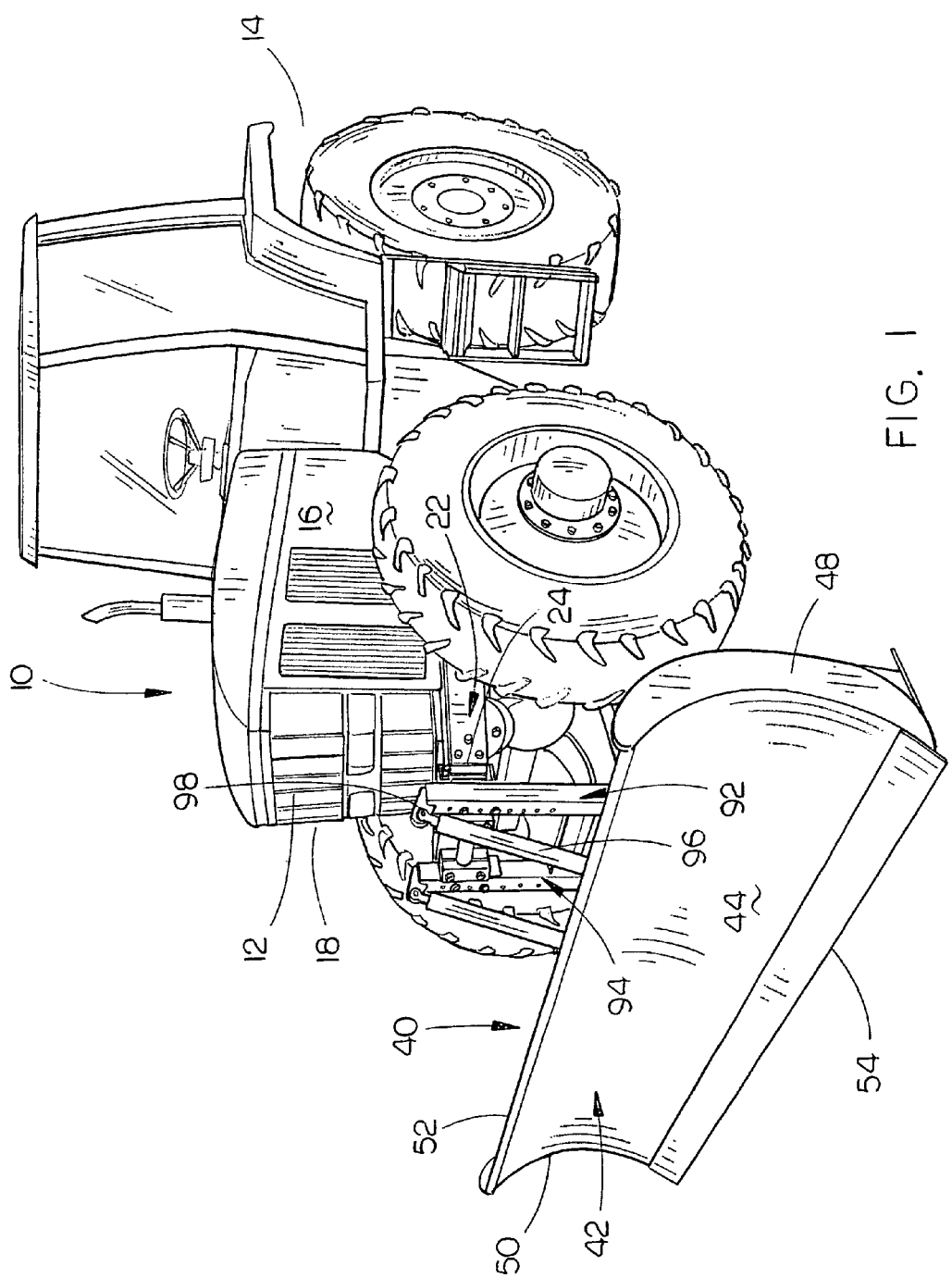
FIG. 1 is a front perspective view of the plow blade mounted on a tractor.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional tractor such as a John Deere 7800. For purposes of description, tractor 10 will be described as having a forward end 12, rearward end 14, left side 16, right side 18 and an underside 20. A first elongated side plate 22 is secured to the left side of the tractor by bolts or the like and has a forward end 24 which is positioned forwardly of the forward end 12 of tractor 10. A second elongated side plate 26 is secured to the right side of the tractor by bolts or the like and has a forward end 28 which is positioned forwardly of the forward end 12 of tractor 10. A weight mount or bracket 30 is secured to the forward ends 24 and 28 of side plates 22 and 26 respectively by bolts or the like and extends therebetween. Weight mount 30 will be described as having an upper end 32, a lower end 34, a front face 36 and a back face 37. An elongated rod 38 is welded to the upper end 32 of mount 30 adjacent front face 36 and extends between the sides of mount 30. Preferably, rod 38 is cylindrical in cross-section but could have a square cross-section or other configuration. Weight mount 30 is designed to have conventional weights mounted thereon to provide added traction weight for those tractors which have front-wheel drive or front-wheel drive assist.

The numeral 40 refers to a plow blade assembly which includes a plow blade 42 having a front side 44, back side 46, left end 48, right end 50, upper end 52 and lower end 54. Plow blade support frame 55 is secured to the back side 46 of plow blade 42 inwardly of end 48 thereof. Plow blade support frame 55' is secured to the back side 46 of plow blade 42 inwardly of end 50 thereof.

The numeral 56 refers to a first attachment frame means which is comprised of attachment frames 56A and 56B. The left end of attachment frame 56A is secured to plow blade support frame 55 by a pin P. The right end of attachment frame 56A is secured to plow blade support frame 55 by pin P'.

For purposes of description, the first attachment frame means 56 will be described as having a forward end 58, rearward end 60, left side 62 and right side 64. The forward end of attachment frame 56B is pivotally secured to attachment frame 56A about a vertical axis at 66.

The numerals 68 and 70 refer to hydraulic cylinders which pivot plow blade 42 about the vertical axis 66. Hydraulic cylinder 68 has its rod end pivotally secured to attachment frame 56B at 72 and has its base end pivotally secured to attachment frame 56A at 74. Hydraulic cylinder 70 has its rod end pivotally secured to attachment frame 56B at 76 and has its base end pivotally secured to attachment frame 56A at 78. Hydraulic cylinders 68 and 70 are fluidly connected to the tractor hydraulic system so that when hydraulic cylinder 68 extends, hydraulic cylinder 70 retracts and so that when hydraulic cylinder 70 extends, hydraulic cylinder 68 retracts.

The rearward end 60 of attachment frame 56B is pivotally secured, about a transverse horizontal axis, to the forward end 80 of a second attachment frame means 82 by pivot pin 84. Attachment frame means 82 includes an elongated, length-adjustable tongue member 86 which extends rearwardly beneath the forward end of the tractor. The rearward end of tongue member 86 is selectively removably secured to bracket 88 which is secured to the underside 20 of the tractor 10 by a transversely extending removable pin 90. Attachment frame means 82 includes upstanding posts 92 and 94. Hydraulic cylinder 96 has its base end pivotally secured to the upper end of post 92 at 98 and has its rod end pivotally secured to attachment frame 56B at 100. Hydraulic cylinder 102 has its base end pivotally secured to the upper end of post 94 at 104 and has its rod end pivotally secured to attachment frame 56B at 106. The retraction of hydraulic cylinders 96 and 102 causes plow blade 42 to be raised and the extension of hydraulic cylinders 96 and 102 causes plow blade 42 to be lowered due to the pivotal connection of the rearward end of attachment frame 56B to the forward end of attachment frame means 82 about the horizontally disposed pin 84.

Figure 2:
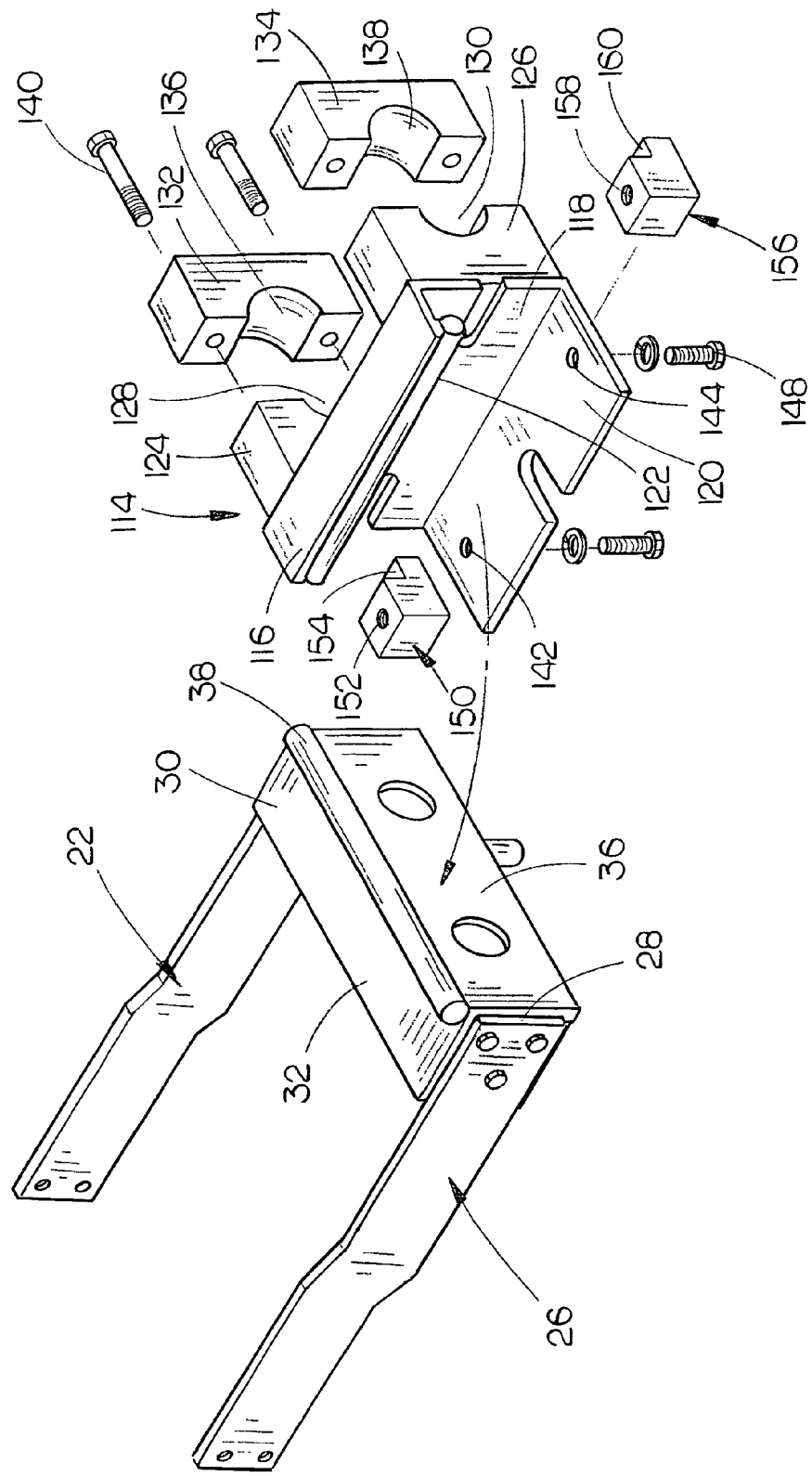
FIG. 2 is a partial exploded perspective view illustrating a portion of the mounting assembly.
Figure 3:
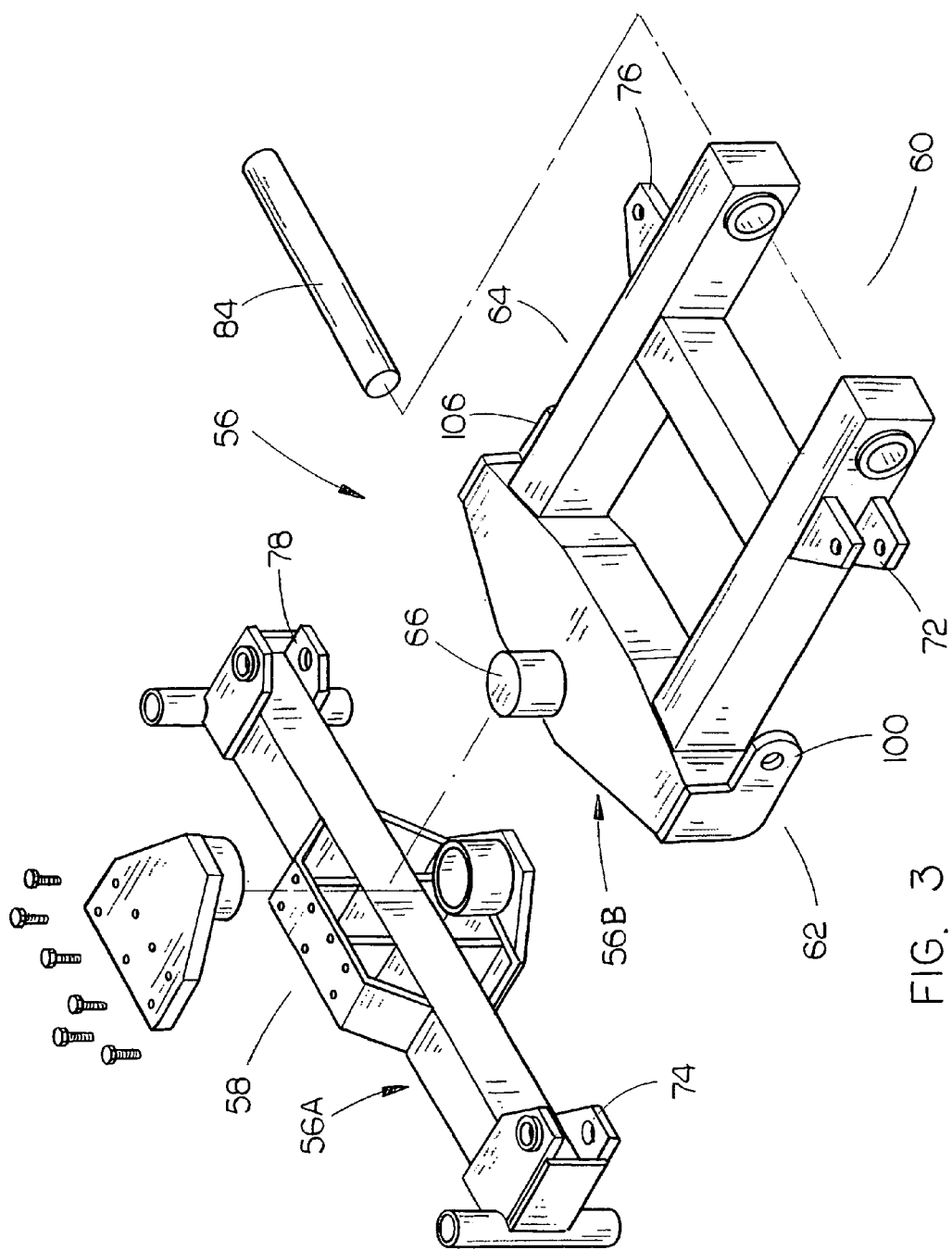
FIG. 3 is a partial exploded perspective view of the mounting assembly.
Figure 4:
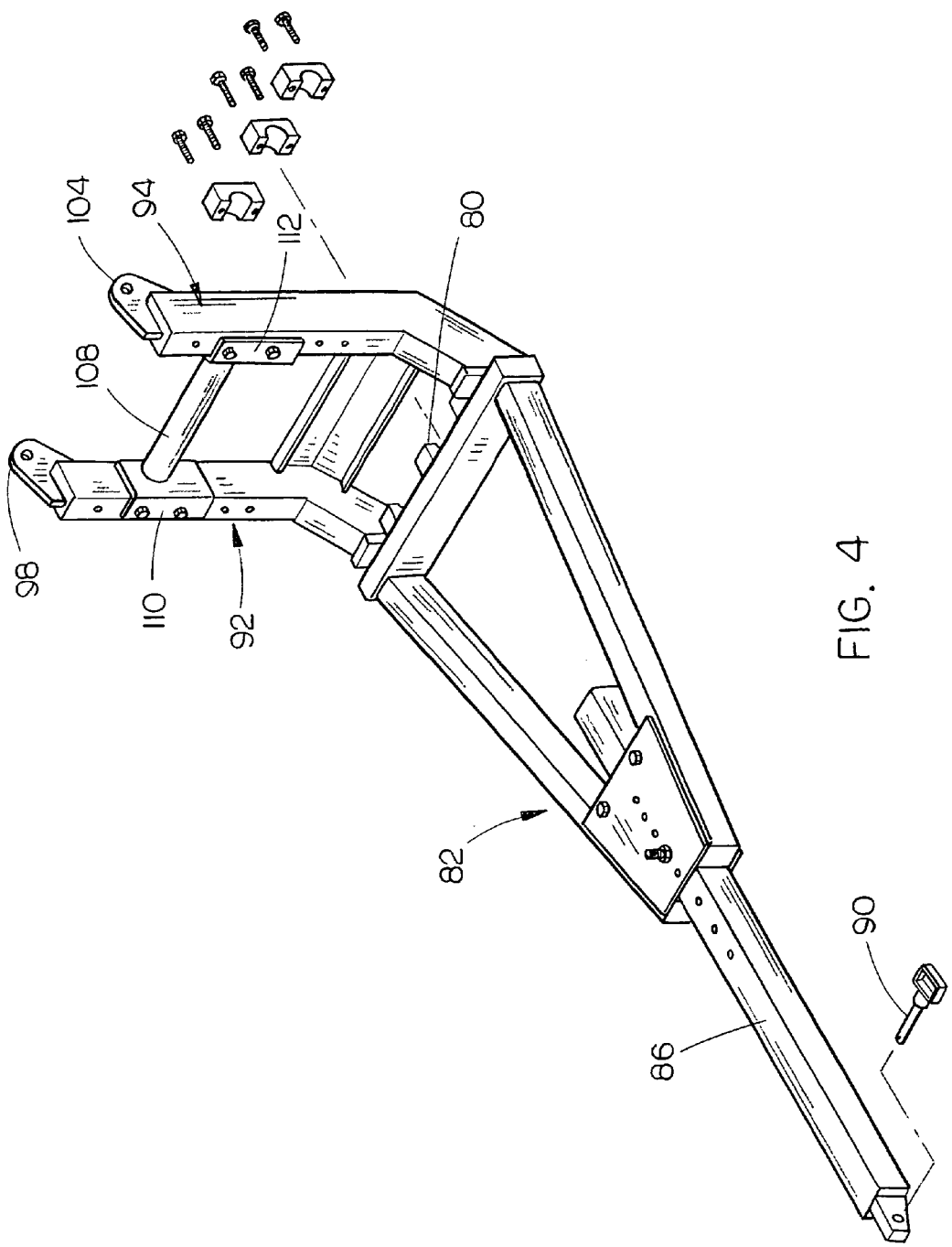
FIG. 4 is a rear perspective view of the second attachment frame means of this invention.
Figure 5:
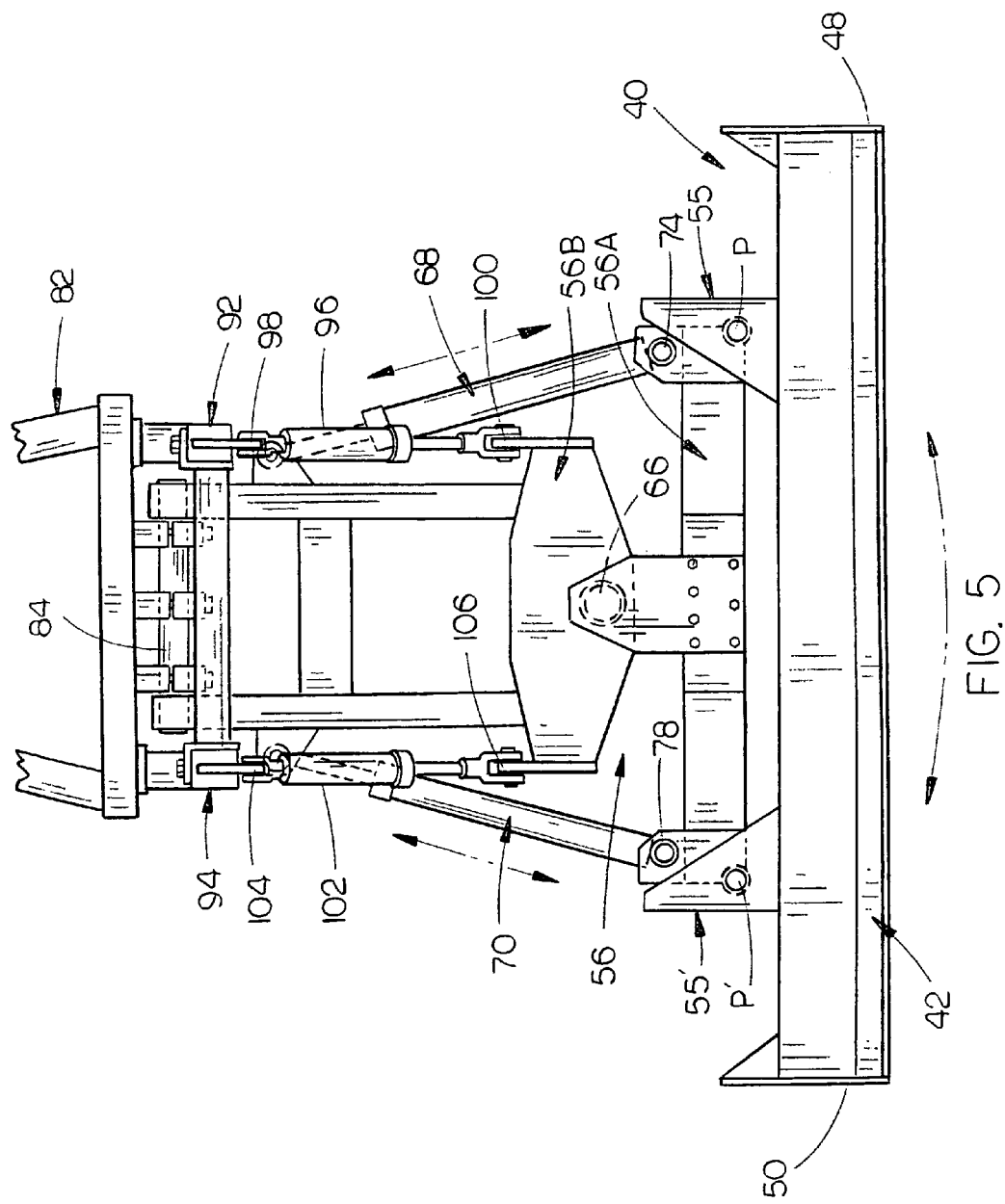
FIG. 5 is a partial top elevational view of the plow blade.
Figure 6:
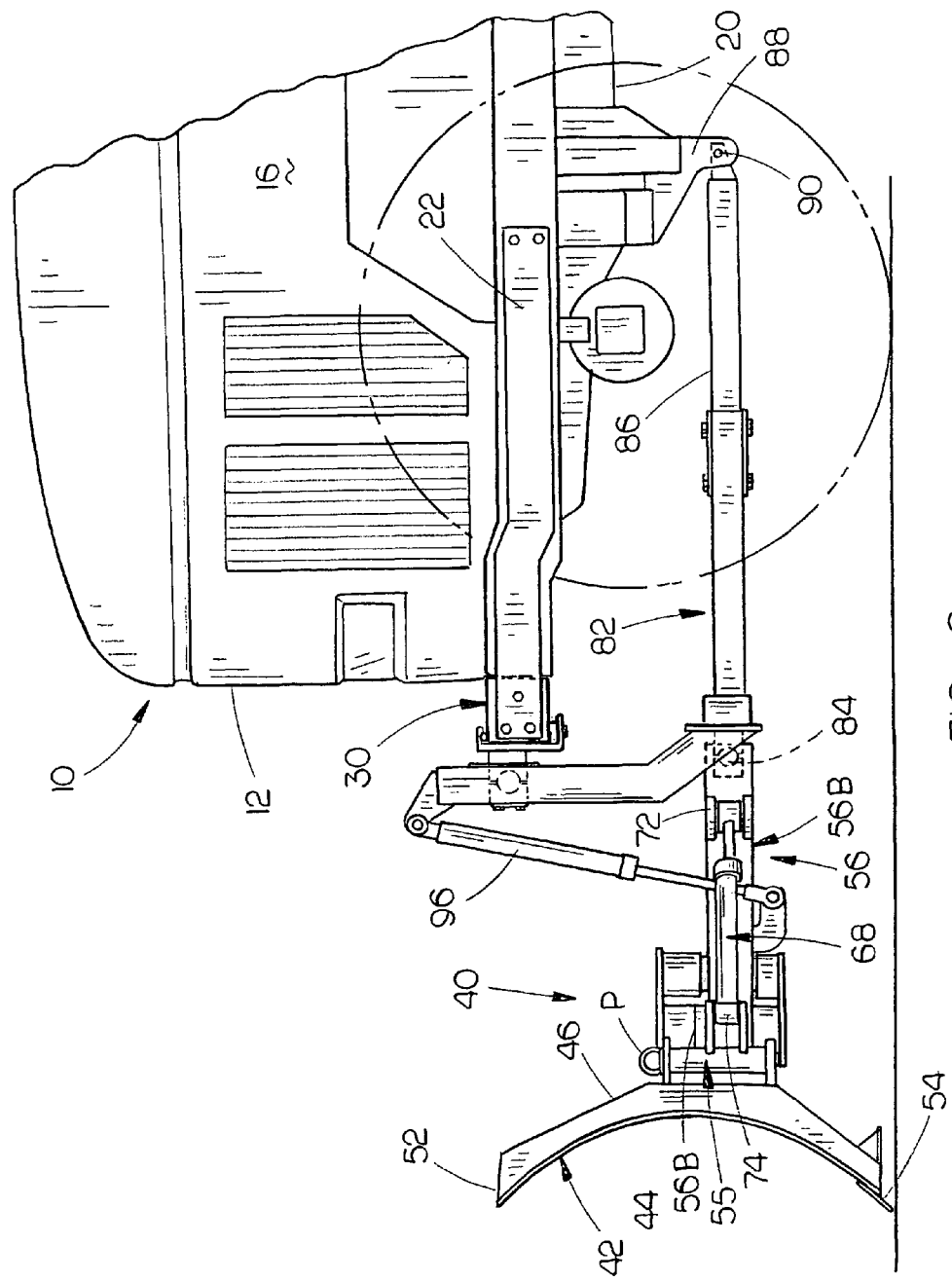
FIG. 6 is a side view of the plow blade mounted on a tractor.

A horizontally disposed support 108 is secured to and extends between brackets 110 and 112 which are secured to posts 92 and 94 by bolts as seen in FIG. 4. The numeral 114 refers to a mounting assembly as best seen in FIG. 2. Mounting assembly 114 is somewhat channel-shaped and includes a top wall 116, front wall 118 and bottom wall 120. An elongated rod 122 is welded to the underside of top wall 116 at the rearward end thereof. Block members 124 and 126 are welded to the forward side of front wall 118 and have semi-circular recesses 128 and 130 formed therein respectively adapted to partially receive support 108 therein. The mounting assembly 114 is held onto the support 108 by block members 132 and 134, having semi-circular recesses 136 and 138 formed therein respectively, by the bolts 140.

Figure 8:
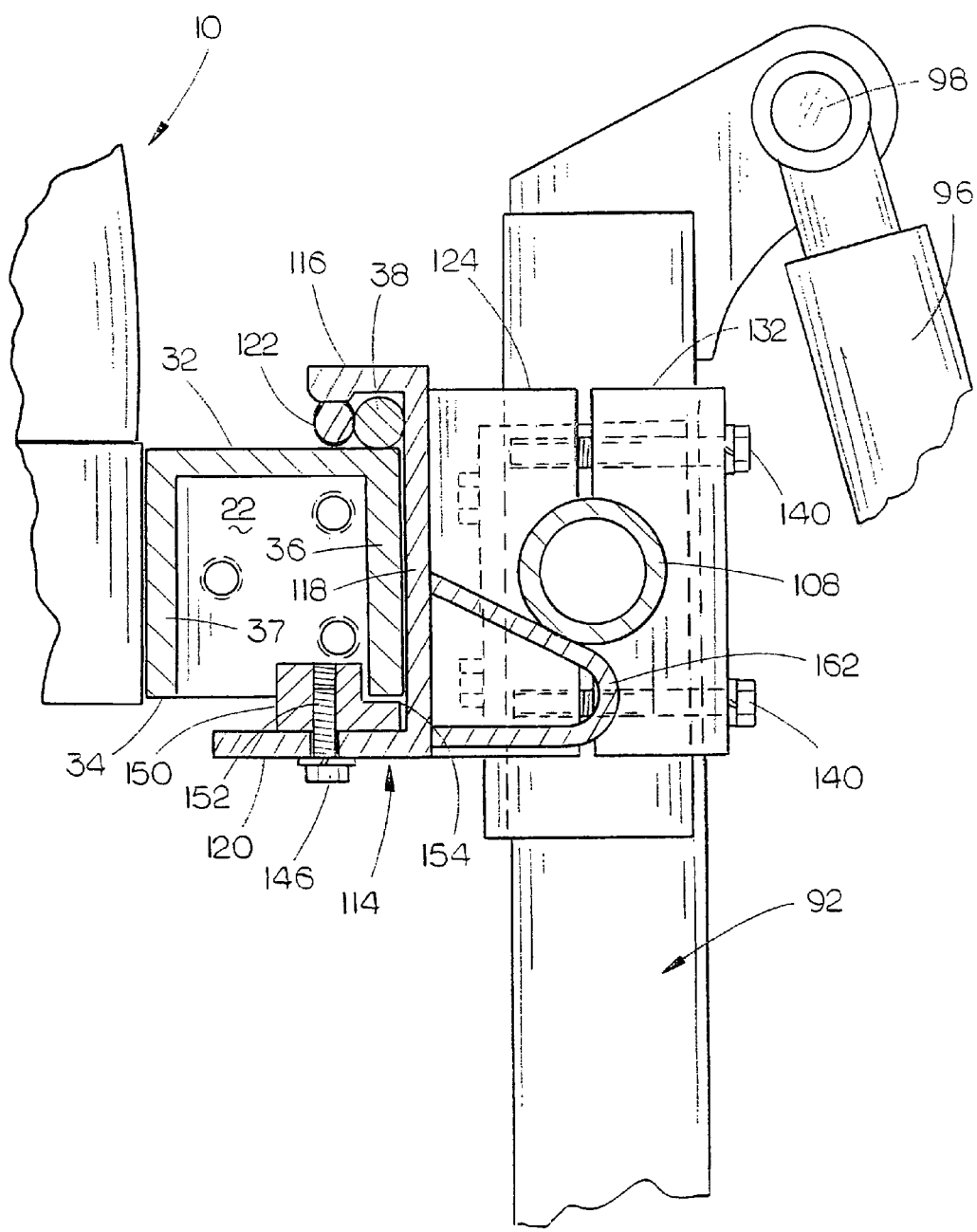
FIG. 8 is a partial sectional view illustrating the mounting assembly mounted on the weight mount of the tractor.

As seen in FIG. 2, bottom wall 120 has a pair of bolt openings 142 and 144 formed therein which are adapted to receive bolts 146 and 148 respectively. The numeral 150 refers to a spacer block having an internally threaded opening 152 formed therein. As seen in FIG. 2, spacer block 150 has a shoulder 154 formed therein. The numeral 156 refers to a spacer block having an internally threaded opening 158 formed therein. Spacer block 156 also has a shoulder 160 formed therein. As seen in FIG. 8, a support 162 extends forwardly from front wall 118 of mounting assembly 114 beneath support 108.

It should be noted that while it is preferred that the plow blade is pivotally secured, about a vertical axis, to the first attachment frame means 52, that pivotal movement could be deleted so that the plow blade is a "straight" plow blade.

Figure 7:
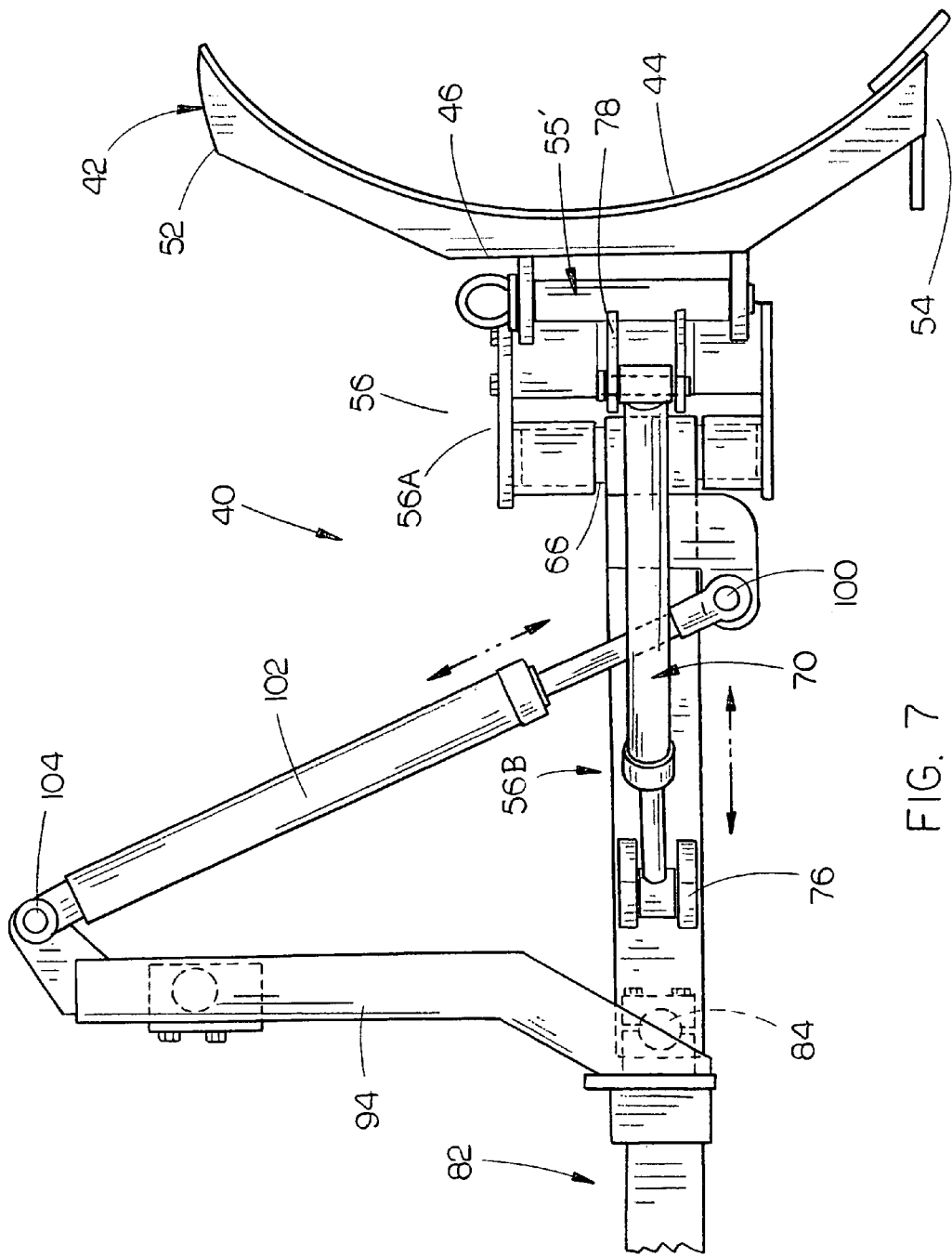
FIG. 7 is partial side view as seen from the right side of the plow blade.

The plow blade assembly 40 is mounted and dismounted from the tractor as will now be described. Assuming that the plow blade assembly 40 has been dismounted from the tractor 10 and is resting on the ground, such as seen in FIG. 7, the tractor 10, having the side plates 22 and 26 and weight mount 30 secured thereto; will be driven towards the rearward end of the second attachment frame means 82 so that the tractor 10 passes over the tongue member 86. When the tractor 10 has reached a point wherein the weight mount 30 is closely adjacent mounting assembly 114, the hydraulic braces for the hydraulic cylinders 68, 70, 96 and 102 will be connected to the tractor hydraulic system. The tractor 10 is then driven forwardly so that support 162 engages support 108 which will cause mounting assembly 114, if not already in the proper position, to move upwardly with respect to weight mount 30 so that rod 122 will pass over rod 38 as the tractor 10 is driven forwardly. When rod 122 is positioned rearwardly of rod 38, the hydraulic cylinders 94 and 96 are retracted somewhat to lower mounting assembly 114 to the position of FIG. 8 so that rod 122 is in the position of FIG. 8. The spacer blocks 150 and 156 are then positioned on the upper surface of bottom wall 120 so that the shoulders 154 and 160 thereof respectively are below the lower end of front wall or face 36. the bolt 146 is then extended upwardly through opening 142 in bottom wall 120 and threadably extended into opening 152 of spacer bloc 150 to hold spacer block 150 in position. The bolt 148 is then extended upwardly through opening 144 in bottom wall 120 and threadably extended into opening 158 in spacer block 156 to hold spacer block 156 in position. With spacer blocks 150 and 156 secured to bottom wall 120, the mounting assembly 114 cannot disconnect from weight mount 30. The rearward end of tongue member 86 is then pinned to bracket 88 by pin 90 if not previously accomplished. The plow blade is then ready to be used.

When it is desired to dismount the plow blade from the tractor, the pin 90 is first removed from the rearward end of tongue member 86 and bracket 88. spacer blocks 150 and 156 are then removed by removing bolts 146 and 148. The hydraulic cylinders 94 and 96 are then extended somewhat to raise mounting assembly 114 with respect to weight mount 30 until rod 122 is positioned above rod 38. The tractor 10 is then moved rearwardly until the weight bracket 30 is clear of mounting assembly 114. The hydraulic braces for the hydraulic cylinder are then disconnect from the tractor hydraulic system.

When the plow blade has been removed from the tractor 10, the tractor 10 may be used in conventional fashion and weights may be mounted on the weight mount 30 in conventional fashion.

Thus it can be seen that a novel tractor-mounted plow blade has been provided which may be quickly and easily mounted on a tractor and dismounted therefrom through the use of two attachment points, that is, the underside of the tractor and the weight mount 30. It can therefore be seen that the invention accomplishes all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. In combination:
    a tractor having a forward end, a rearward end, a first side, a second side, and an underside;
    a plow blade having a front side, a back side, a first end, a second end, an upper end, and a lower end;
    a first attachment frame means having a forward end, a rearward end, a first side and a second side;
    said first attachment frame means including a first attachment frame and a second attachment frame;
    each of said first and second attachment frames having a forward end, a rearward end, a first side and a second side;
    said first attachment frame being secured to said back side of said plow blade;
    said forward end of said second attachment frame being pivotally secured, about a vertical axis, to said first attachment frame;
    a first hydraulic cylinder secured to and extending between said first side of said second attachment frame means and said first side of said first attachment frame for pivotally moving said first attachment frame and said plow blade with respect to said forward end of said second attachment frame;
    a second hydraulic cylinder secured to and extending between said second side of said second attachment frame means and said second side of said first attachment frame for pivotally moving said first attachment frame and said plow blade with respect to said forward end of said second attachment frame;
    said first and second hydraulic cylinders being movable between retracted and extended positions;
    said first and second hydraulic cylinders being fluidly connected so that when said first hydraulic cylinder is extending, said second hydraulic cylinder is retracting and so that when said first hydraulic cylinder is retracting, said second hydraulic cylinder is extending;
    a second attachment frame means having a forward end, a rearward end, a first side and a second side;
    said rearward end of said second attachment frame means being selectively removably secured to said tractor at the underside thereof rearwardly of the forward end thereof;
    said forward end of said second attachment frame means being pivotally secured, about a horizontal axis, to said rearward end of said second attachment frame;
    said second attachment frame means including a first upstanding post having upper and lower ends and a second upstanding post having upper and lower ends;
    said first and second upstanding posts extending upwardly from said forward end of said second attachment frame means in a horizontally spaced-apart manner;
    a third hydraulic cylinder secured to and extending between said first upstanding post and said second attachment frame;

a fourth hydraulic cylinder secured to and extending between said second upstanding post and said second attachment frame;

said third and fourth hydraulic cylinders being movable between extended and retracted positions;

the retraction of said third and fourth hydraulic cylinders causing said plow blade to be raised with respect to said second attachment frame means;

the extension of said third and fourth hydraulic cylinders causing said plow blade to be lowered with respect to said second attachment frame means;

a horizontally disposed first support secured to and extending between said first and second upstanding posts;

a mounting assembly secured to said first support;

said mounting assembly including a top wall having a forward end, a rearward end, a first end, a second end, an upper side and a lower side;

said mounting assembly also having a front wall, having upper and lower ends, which extends downwardly from said top wall adjacent said forward end thereof;

said mounting assembly further including a bottom wall which extends rearwardly from said lower end of said front wall;

said mounting assembly having an elongated rod secured to lower side of said top wall at said rearward end of said top wall;

a first elongated side plate, having rearward and forward ends, secured to said first side of said tractor;

a second elongated side plate, having rearward and forward ends, secured to said second side of said tractor;

a weight mount secured to said forward ends of said first and second side plates and extending therebetween;

said weight mount including a forward end, a rearward end, an upper end, and a lower end;

said weight mount having an elongated transversely extending rod secured thereto at the upper forward end thereof;

said mounting assembly being selectively removably mounted on said weight mount;

said elongated rod of said mounting assembly being positioned on said upper end of said weight mount rearwardly of said elongated rod on said weight mount and in engagement therewith when said first mounting assembly is mounted on said weight mount;

said bottom wall of said first mounting assembly extending rearwardly beneath said lower end of said weight mount when said mounting assembly is mounted on said weight mount.

2. The combination of claim 1 wherein a spacer block is positioned between said bottom wall of said mounting assembly and said weight mount when said mounting assembly is mounted on said weight mount.

3. The combination of claim 2 wherein said spacer block is selectively removably bolted to said bottom wall of said mounting assembly when said mounting assembly is mounted on said weight mount.

4. In combination:
a tractor having a forward end, a rearward end, a first side, a second side, and an underside;

a plow, blade having a front side, a back side, a first end, a second end, an upper end, and a lower end;

a first attachment frame means having a forward end, a rearward end, a first side and a second side;

said first attachment frame means being secured to said back side of said plow blade;

a second attachment frame means having a forward end, a rearward end, a first side and a second side;

said rearward end of said second attachment frame means being adapted to be selectively removably secured to said tractor at the underside thereof rearwardly of the forward end thereof;

said forward end of said second attachment frame means being pivotally secured, about a horizontal axis, to said rearward end of said first attachment frame means;

said second attachment frame means including a first upstanding frame member having upper and lower ends and a second upstanding frame member having upper and lower ends;

said first and second upstanding frame members extending upwardly from said forward end of said second attachment frame means in a horizontally spaced-apart manner;

a first hydraulic cylinder secured to and extending between said first upstanding frame member and said first attachment frame means;

a second hydraulic cylinder secured to and extending between said second upstanding frame member and said first attachment frame means;

said first and second hydraulic cylinders being movable between extended and retracted positions;

the retraction of said first and second hydraulic cylinders causing said plow blade to be raised with respect to said second attachment frame means;

the extension of said first and second hydraulic cylinders causing said plow blade to be lowered with respect to said second attachment frame means;

a horizontally disposed support secured to and extending between said first and second upstanding frame members;

a mounting assembly secured to said support;

said mounting assembly including a top wall having a forward end, a rearward end, a first end, a second end, an upper side and a lower side;

said mounting assembly also having a front wall, having upper and lower ends, which extends downwardly from said top wall adjacent said forward end thereof;

said mounting assembly further including a bottom wall which extends rearwardly from said lower end of said front wall;

said mounting assembly having an elongated rod secured to lower side of said top wall at said rearward end of said top wall;

a first elongated side plate, having rearward and forward ends, secured to said first side of said tractor;

a second elongated side plate, having rearward and forward ends, secured to said second side of said tractor;

a weight mount secured to said forward ends of said first and second side plates and extending therebetween;

said weight mount including a forward end, a rearward end, an upper end, and a lower end;

said weight mount having an elongated transversely extending rod secured thereto at the upper forward end thereof;

said mounting assembly being selectively removably mounted on said weight mount;

said elongated rod of said mounting assembly being positioned on said upper end of said weight mount rearwardly of said elongated rod on said weight mount and in engagement therewith when said mounting assembly is mounted on said weight mount;

said bottom plate of said mounting assembly extending rearwardly beneath said lower end of said weight mount when said mounting assembly is mounted on said weight mount.

5. The combination of claim 4 wherein a spacer block is positioned between said bottom wall of said mounting assembly and said weight mount when said mounting assembly is mounted on said weight mount.

6. The combination of claim 5 wherein said spacer block is selectively removably bolted to said bottom wall of said mounting assembly when said mounting assembly is mounted on said weight mount.

7. In combination with a tractor having a forward end, a rearward end, a first side, a second side, and an underside, comprising:
- a plow blade having a front side, a back side, a first end, a second end, an upper end, and a lower end;
- a first attachment frame means having a forward end, a rearward end, a first side and a second side;
- said forward end of said first attachment frame means being operatively pivotally connected, about a vertical axis, to said back side of said plow blade;
- a first hydraulic cylinder secured to and extending between said first side of said first attachment frame means and said plow blade for pivotally moving said plow blade with respect to said first attachment frame means;
- a second hydraulic cylinder secured to and extending between said second side of said first attachment frame means and said plow blade for pivotally moving said plow blade with respect to said first attachment frame means;
- said first and second hydraulic cylinders being movable between retracted and extended positions;
- said first and second hydraulic cylinders being fluidly connected so that when said first hydraulic cylinder is extending, said second hydraulic cylinder is retracting and so that when said first hydraulic cylinder is retracting, said second hydraulic cylinder is extending;
- a second attachment frame means having a forward end, a rearward end, a first side and a second side;
- said rearward end of said second attachment frame means being selectively removably secured to said tractor at the underside thereof rearwardly of the forward end thereof;
- said forward end of said second attachment frame means being pivotally secured, about a horizontal axis, to said rearward end of said first attachment frame means;
- said second attachment frame means including a first upstanding frame member having upper and lower ends and a second upstanding frame member having upper and lower ends;
- said first and second upstanding frame members extending upwardly from said forward end of said second attachment frame means in a horizontally spaced-apart manner;
- a third hydraulic cylinder secured to and extending between said first upstanding frame member and said first attachment frame means;
- a fourth hydraulic cylinder secured to and extending between said second upstanding frame member and said first attachment frame means;
- said third and fourth hydraulic cylinders being movable between extended and retracted positions;
- the retraction of said third and fourth hydraulic cylinders causing said plow blade to be raised with respect to said second attachment frame means;
- the extension of said third and fourth hydraulic cylinders causing said plow blade to be lowered with respect to said second attachment frame means;
- a horizontally disposed support secured to and extending between said first and second upstanding frame members;
- a mounting assembly secured to said support;
- said mounting assembly including a top wall having a forward end, a rearward end, a first end, a second end, an upper side and a lower side;
- said mounting assembly also having a front wall, having upper and lower ends, which extends downwardly from said top wall adjacent said forward end thereof;
- said mounting assembly further including a bottom wall which extends rearwardly from said lower end of said front wall;
- said mounting assembly having an elongated rod secured to lower side of said top wall at said rearward end of said top wall;
- a first elongated side plate, having rearward and forward ends, secured to said first side of said tractor;
- a second elongated side plate, having rearward and forward ends, secured to said second side of said tractor;
- a weight mount secured to said forward ends of said first and second side plates and extending therebetween;
- said weight mount including a forward end, a rearward end, an upper end, and a lower end;
- said weight mount having an elongated transversely extending rod secured thereto at the upper forward end thereof;
- said mounting assembly being selectively removably mounted on said weight mount;
- said elongated rod of said mounting assembly being positioned on said upper end of said weight mount rearwardly of said elongated rod on said weight mount and in engagement therewith when said mounting assembly is mounted on said weight mount;
- said bottom plate of said mounting assembly extending rearwardly beneath said lower end of said weight mount when said mounting assembly is mounted on said weight mount.

8. The combination of claim 7 wherein a spacer block is positioned between said bottom wall of said mounting assembly and said weight mount when said mounting assembly is mounted on said weight mount.

9. The combination of claim 8 wherein said spacer block is selectively removably bolted to said bottom wall of said mounting assembly when said mounting assembly is mounted on said weight mount.

10. In combination with a tractor having a forward end, a rearward end, a first side, a second side, and an underside, comprising:
- a plow blade having a front side, a back side, a first end, a second end, an upper end, and a lower end;
- a first attachment frame means having a forward end, a rearward end, a first side and a second side;
- said first attachment frame means being secured to said plow blade;
- a second attachment frame means having a forward end, a rearward end, a first side and a second side;
- said rearward end of said second attachment frame means being selectively removably secured to said tractor at the underside thereof rearwardly of the forward end thereof;
- said forward end of said second attachment frame means being pivotally secured, about a horizontal axis, to said rearward end of said first attachment frame means;
- said second attachment frame means including a first upstanding frame member having upper and lower ends and a second upstanding frame member having upper and lower ends;

said first and second upstanding frame members extending upwardly from said forward end of said second attachment frame means in a horizontally spaced-apart manner;

a first hydraulic cylinder secured to and extending between said first upstanding frame member and said first attachment frame means;

a second hydraulic cylinder secured to and extending between said second upstanding frame member and said first attachment frame means;

said first and second hydraulic cylinders being movable between extended and retracted positions;

the retraction of said first and second hydraulic cylinders causing said plow blade to be raised with respect to said second attachment frame means;

the extension of said first and second hydraulic cylinders causing said plow blade to be lowered with respect to said second attachment frame means;

a horizontally disposed support secured to and extending between said first and second upstanding frame members;

a mounting assembly secured to said support;

said mounting assembly including a top wall having a forward end, a rearward end, a first end, a second end, an upper side and a lower side;

said mounting assembly also having a front wall, having upper and lower ends, which extends downwardly from said top wall adjacent said forward end thereof;

said mounting assembly further including a bottom wall which extends rearwardly from said lower end of said front wall;

said mounting assembly having an elongated rod secured to lower side of said top wall at said rearward end of said top wall;

a first elongated side plate, having rearward and forward ends, secured to said first side of said tractor;

a second elongated side plate, having rearward and forward ends, secured to said second side of said tractor;

a weight mount secured to said forward ends of said first and second side plates and extending therebetween;

said weight mount including a forward end, a rearward end, an upper end, and a lower end;

said weight mount having an elongated transversely extending rod secured thereto at the upper forward end thereof;

said mounting assembly being selectively removably mounted on said weight mount;

said elongated rod of said mounting assembly being positioned on said upper end of said weight mount rearwardly of said elongated rod on said weight mount and in engagement therewith when said mounting assembly is mounted on said weight mount;

said bottom wall of said mounting assembly extending rearwardly beneath said lower end of said weight mount when said mounting assembly is mounted on said weight mount.

11. The combination of claim 7 wherein a spacer block is positioned between said bottom wall of said mounting assembly and said weight mount when said mounting assembly is mounted on said weight mount.

12. The combination of claim 11 wherein said spacer block is selectively removably bolted to said bottom wall of said mounting assembly when said mounting assembly is mounted on said weight mount.

* * * * *